(12) United States Patent
Mitomo (10) Patent No.: US 9,451,108 B1
(45) Date of Patent: Sep. 20, 2016

(54) IMAGE FORMING APPARATUS

(71) Applicant: CANON KABUSHIKI KAISHA, Tokyo (JP)

(72) Inventor: Akihiro Mitomo, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/051,337

(22) Filed: Feb. 23, 2016

(30) Foreign Application Priority Data

Feb. 26, 2015 (JP) ................. 2015-037025

(51) Int. Cl.
*B41J 29/393* (2006.01)
*H04N 1/00* (2006.01)

(52) U.S. Cl.
CPC ................. *H04N 1/00554* (2013.01)

(58) Field of Classification Search
CPC .......... B41J 2/01; B41J 11/00; B41J 11/006; B41J 29/13; B41J 2/14
See application file for complete search history.

(56) References Cited

U.S. PATENT DOCUMENTS

| 8,662,659 B2* | 3/2014 | Tsuji ............... B26D 1/205 347/101 |
| 8,814,348 B2* | 8/2014 | Enomoto ........... B41J 13/0045 347/104 |
| 9,290,025 B2* | 3/2016 | Lo ................. B41J 13/0009 |

FOREIGN PATENT DOCUMENTS

| JP | 7-92879 A | 4/1995 |
| JP | 2006-240071 A | 9/2006 |

* cited by examiner

*Primary Examiner* — Lamson Nguyen
(74) *Attorney, Agent, or Firm* — Canon USA, Inc. I.P. Division (57) ABSTRACT

An image forming apparatus includes an apparatus main body, an opening/closing portion that is opened or closed relative to the apparatus main body, a first member configured to move as the opening/closing portion is opened or closed, a second member that contacts the first contact portion in the first member and interlocks with the first member, a sensor configured to generate a signal corresponding to a position of the second member, and a recess portion that is provided in one of the first contact portion and the second contact portion and engages with another portion of the first contact portion and the second contact portion, in which the recess portion has a surface inclined relative to a movement direction of the first contact portion.

20 Claims, 11 Drawing Sheets

SECOND POSITION

FIG.10

IMAGE FORMING APPARATUS

BACKGROUND OF THE INVENTION

1. Field of the Invention

The present invention relates to an image forming apparatus that forms an image on a sheet.

2. Description of the Related Art

In an image forming apparatus, an openable/closable door (opening/closing portion) is provided on an upper surface or a side surface of an apparatus main body to perform maintenance (perform sheet removal when a sheet remains in the apparatus or replacement of a consumable).

A detection unit detects whether the opening/closing portion is opened or closed (see Japanese Patent Application Laid-Open Nos. 7-92879 and 2006-240071). In Japanese Patent Application Laid-Open No. 7-92879, when a plurality of levers, which interlocks with an opening or closing operation of an opening/closing portion is operated, a switch is turned on or off. In a case where the lever is deformed or is inclined, the following malfunction may occur. Although contact portions of the plurality of levers are configured to contact one another to transmit an opening or closing operation, in the above case the contact becomes poor, so that opening or closing of the opening/closing portion cannot be detected.

SUMMARY OF THE INVENTION

The present invention is directed to providing an apparatus capable of reliably detecting opening or closing of an opening/closing portion.

According to an aspect of the present invention, an image forming apparatus includes an apparatus main body provided with an image forming unit configured to form an image on a sheet, an opening/closing portion that is opened or closed relative to the apparatus main body, a first member configured to move as the opening/closing portion is opened or closed, a second member including a second contact portion that contacts the first contact portion in the first member and interlocks with the first member, a sensor configured to generate a signal corresponding to a position of the second member, and a recess portion that is provided in one of the first contact portion and the second contact portion and engages with another portion of the first contact portion and the second contact portion, in which the recess portion has a surface inclined relative to a movement direction of the first contact portion.

Further features of the present invention will become apparent from the following description of exemplary embodiments with reference to the attached drawings.

DESCRIPTION OF THE EMBODIMENTS

Figure 1:
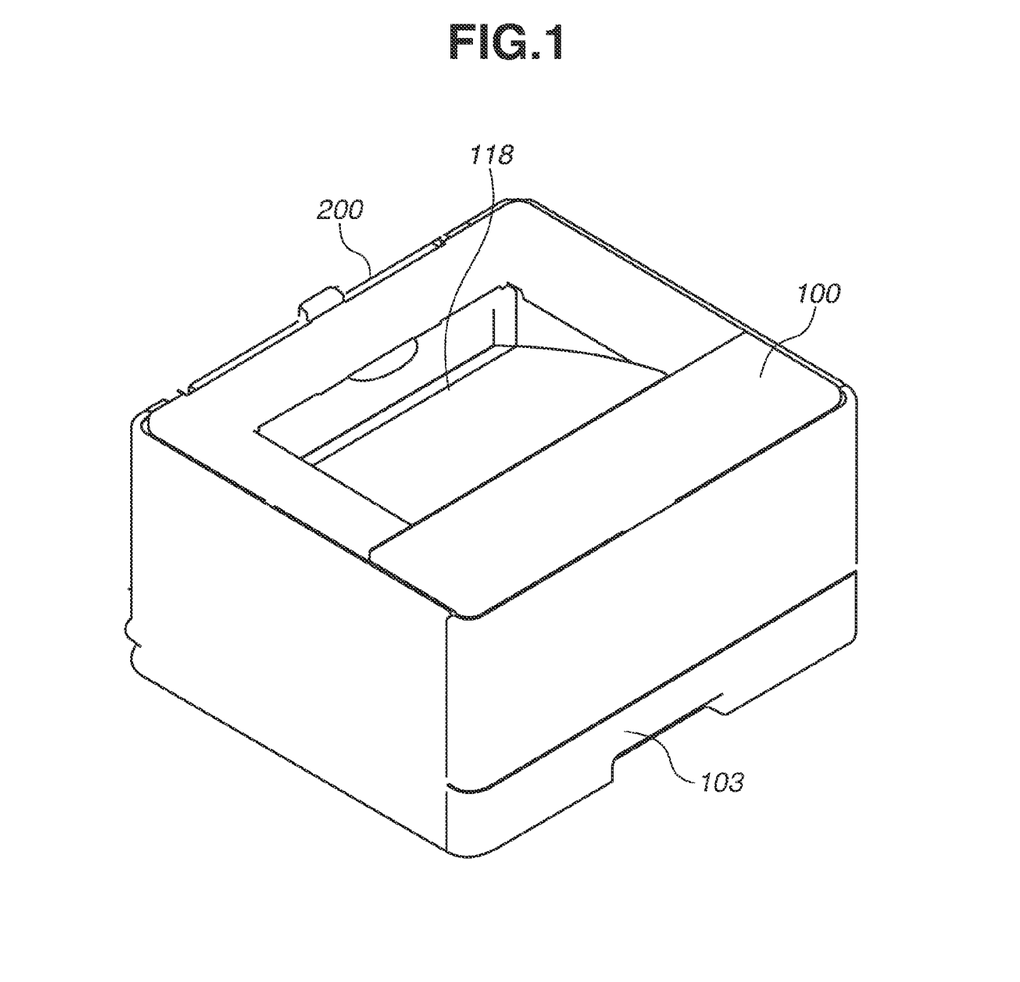
FIG. 1 is an external perspective view of an image forming apparatus according to an exemplary embodiment of the present invention.
Figure 2:
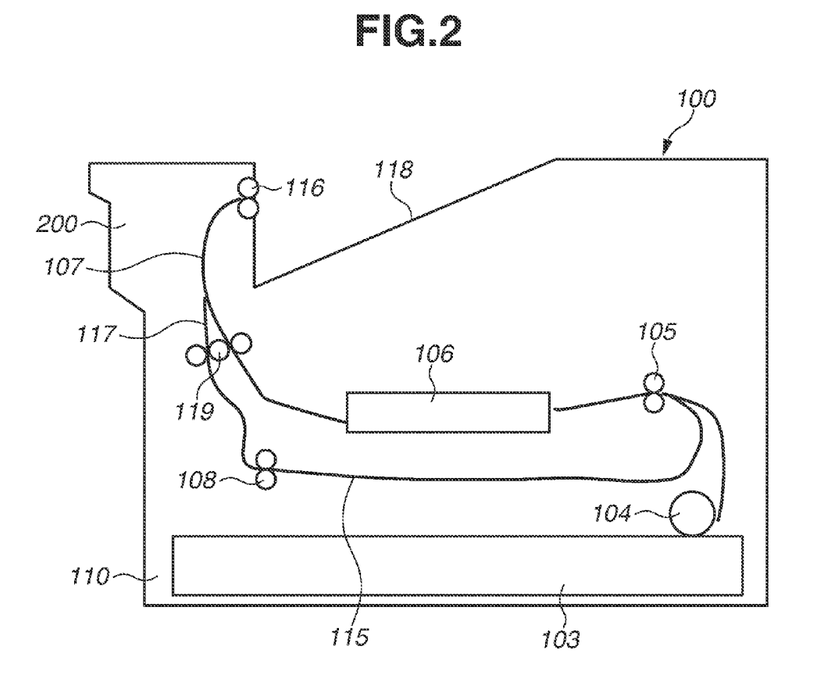
FIG. 2 is a schematic sectional view of the image forming apparatus according to the exemplary embodiment of the present invention.

A schematic configuration of an image forming apparatus according to an exemplary embodiment of the present invention will be described with reference to FIGS. 1 and 2. FIG. 1 is an external perspective view of the image forming apparatus, and FIG. 2 is a cross-sectional view of the image forming apparatus.

A sheet cassette 103 in which sheets S serving as recording media are stacked and stored is arranged in a lower part of an image forming apparatus 100. A feeding roller 104 feeds the sheets S stored in the sheet cassette 103 one by one toward the downstream side in a conveyance direction. A conveyance roller 105 feeds the sheet S, which has been fed by the feeding roller 104, to an image forming unit 106 that forms an image on the sheet S.

A conveyance roller 119 conveys the sheet S, on which the image has been formed by the image forming unit 106, to a discharge roller pair 116 via a discharge path 107. The discharge roller pair 116 stacks the sheet S on a discharge unit 118.

When the image is formed on both surfaces of the sheet S, the sheet S is reversed while the discharge roller pair 116 is conveying the sheet S, and is conveyed to a reverse path 117. A double-sided conveyance roller 108 feeds the sheet S again to the conveyance roller 105 via the reverse path 117 and the double-sided conveyance path 115, and the image forming unit 106 forms the image on a reverse surface of the sheet S.

Figure 3:
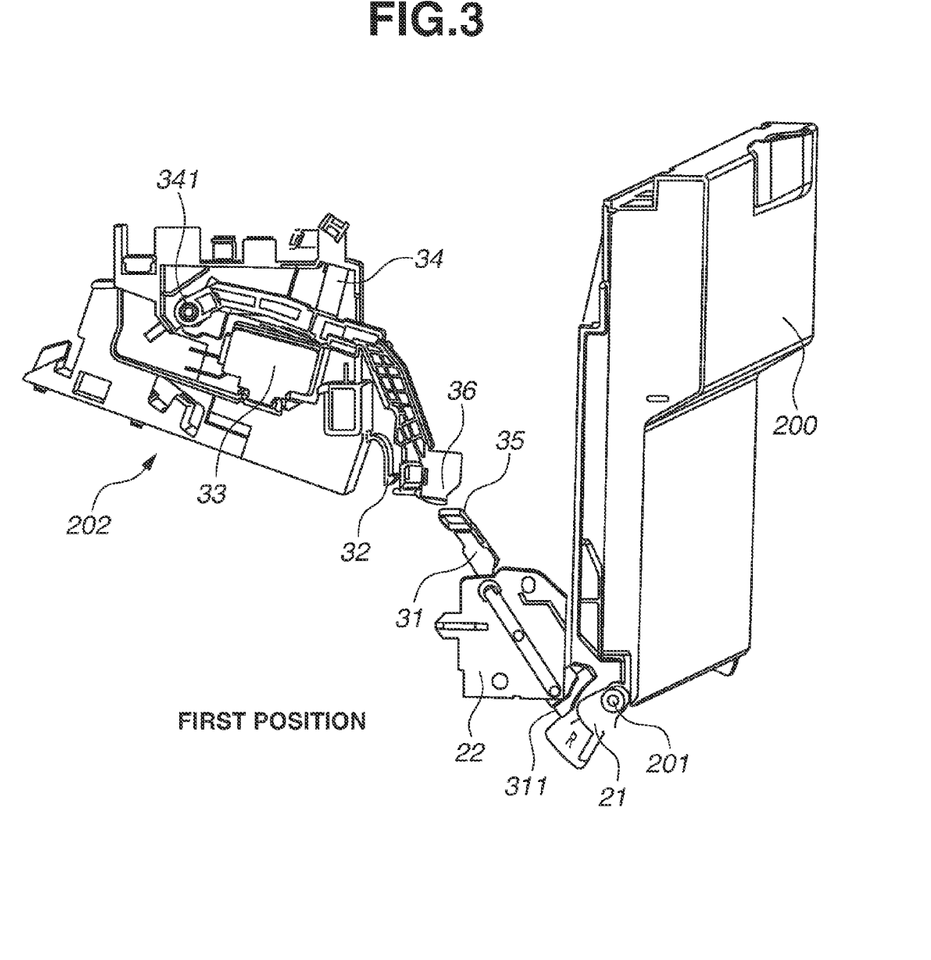
FIG. 3 is a partially perspective view illustrating a state where a door of the image forming apparatus according to the exemplary embodiment of the present invention is closed.
Figure 4:
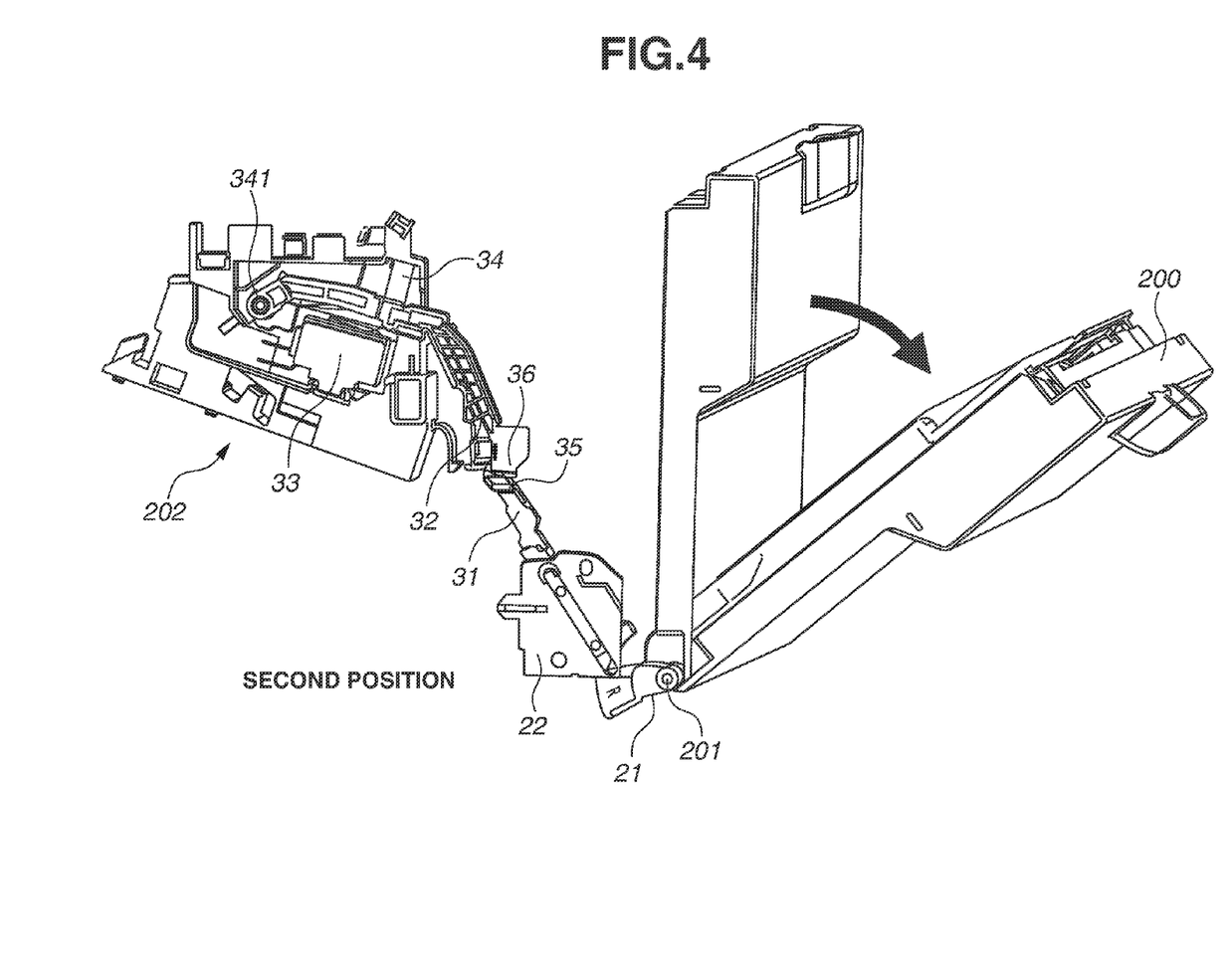
FIG. 4 is a partially perspective view illustrating a state where the door of the image forming apparatus according to the exemplary embodiment of the present invention is open.

The image forming apparatus 100 includes a door 200 for opening the discharge path 107 and the reverse path 117 which are rotatably provided. A configuration and an operation associated with opening or closing of the door 200 serving as an opening/closing portion will be described below with reference to FIGS. 3 and 4. FIG. 3 is a partially perspective view of the image forming apparatus 100 illustrating a state where the door 200 is closed (a closed state). FIG. 4 is a partially perspective view of the image forming apparatus 100 illustrating a state where the door 200 is open.

The door 200 in the image forming apparatus 100 is rotatably provided in a main body of the image forming apparatus 100 (hereinafter referred to as an apparatus main body) which is equipped with the image forming unit 106 around a rotation shaft 201, as illustrated in FIGS. 3 and 4. When the conveyance of the sheets S is interrupted for any reason such as a sheet conveyance abnormality during image formation, work of removing the sheet S remaining in a sheet conveying path is required. In the present exemplary embodiment, when the sheet S remains in the discharge path 107 and the reverse path 117 downstream of the image forming unit 106, the door 200 is opened to remove the remaining sheet S.

When an image forming operation is performed, the door 200 needs to remain closed. The image forming apparatus 100 is provided with a detection unit 202 illustrated in FIGS. 3 and 4 for detecting whether the door 200 remains closed or remains open.

A configuration and an operation of the detection unit 202 will be described below.

The detection unit 202 includes a lever pressing member 31 that moves as the door 200 rotates, a switch lever 32 that moves being pressed by the lever pressing member 31, and a detection switch 33 that is turned on or off by the switch lever 32.

An opening/closing cam 21 is provided at an end of the rotation shaft 201. The lever pressing member 31 held by a guide member 22 is arranged above the opening/closing cam 21. The lever pressing member 31 is linearly movable in a substantially vertical direction. A lower end 311 of the lever pressing member 31 serving as a first member contacts a cam surface of the opening/closing cam 21, and the lever pressing member 31 substantially moves up and down as the opening/closing cam 21 rotates.

When the door 200 is closed, the lever pressing member 31 is at a first position at a lower end of a movable range. When the door 200 is open, the lever pressing member 31 is pushed up by the opening/closing cam 21 and moved to a second position at an upper end of the movable range.

The switch lever 32 and the detection switch 33 each serving as a second member, which interlock with the lever pressing member 31, are arranged above the lever pressing member 31.

The switch lever 32 is rotatably pivoted on a support portion 341. The switch lever 32 is urged in a clockwise direction to a standby position, i.e., urged around the support portion 341 by a pressing unit (pressing spring) 34. When the switch lever 32 is at the standby position, the switch lever 32 presses a switch portion of the detection switch 33, so that the detection switch 33 is rendered electrically conductive. Thus, the detection switch serving as a sensor outputs a signal indicating that the door 200 is closed.

A second contact portion 36 serving as a rotation end of the switch lever 32 can contact a first contact portion 35 in the lever pressing member 31. When the lever pressing member 31 moves upward, the first contact portion 35 contacts the second contact portion 36 in the switch lever 32. The first contact portion 35 moves the second contact portion 36 upward, i.e., moves the switch lever 32 in a counterclockwise direction against an urging force of the pressing unit 34 (pressing spring).

When the first contact portion 35 presses the second contact portion 36 serving as the rotation end of the switch lever 32 in an opposite direction to a pressing direction of the pressing unit 34, the switch lever 32 separates from the switch portion of the detection switch 33. The detection switch 33 is rendered electrically non-conductive. Thus, the detection switch 33 outputs a signal indicating that the door 200 is open.

As described above, when the door 200 is closed, the lever pressing member 31 is at the first position. At this time, the first contact portion 35 in the lever pressing member 31 and the second contact portion 36 in the switch lever 32 are separated from each other, and the switch lever 32 is located at the standby position where the detection switch 33 is rendered electrically conductive. On the other hand, when the door 200 is opened, the lever pressing member 31 is at the second position. At this time, the first contact portion 35 in the lever pressing member 31 pushes up the second contact portion 36 in the switch lever 32, and the switch lever 32 is located at a position where the detection switch 33 is rendered electrically non-conductive.

As described above, the image forming apparatus can recognize an opening or closing state of the door 200 according to an electric signal from the detection unit 33 that is switched between conduction and non-conduction.

In the image forming apparatus 100, one of conditions for enabling an image forming operation is that the door 200 is closed. The image forming apparatus 100 is controlled not to perform the image forming operation when it is detected that the door 200 is open.

Figure 9:
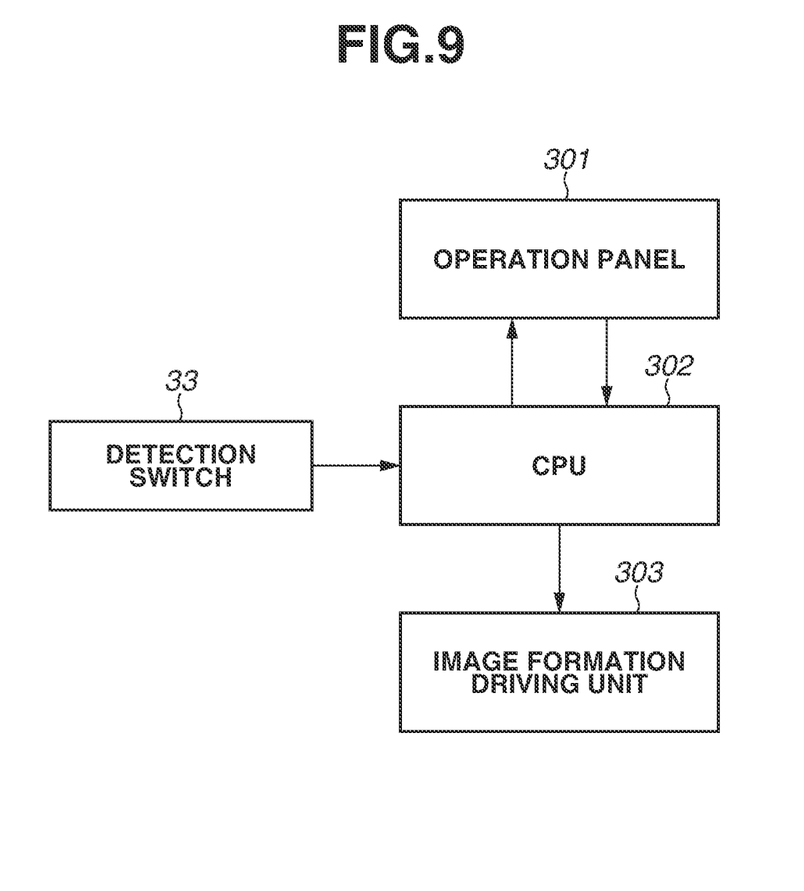
FIG. 9 is a block diagram of a control system for an image forming operation of the image forming apparatus according to the exemplary embodiment of the present invention.
Figure 10:
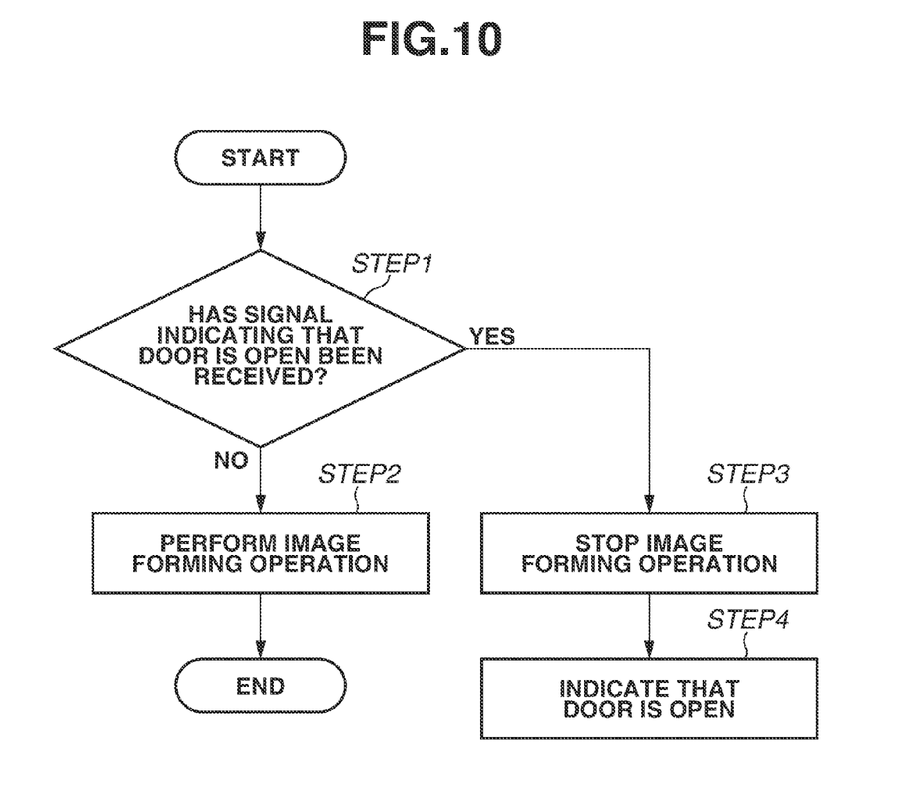
FIG. 10 is a flowchart illustrating the image forming operation of the image forming apparatus according to the exemplary embodiment of the present invention.

FIG. 9 is a control block diagram of the image forming apparatus 100 illustrating detection of opening or closing of the door 200. A control unit (a central processing unit (CPU)) 302 that controls an image formation driving unit 303 switches display of an operation panel 301 in response to a signal from the detection switch 33 in the detection unit 202. A more specific operation of the control unit 302 is illustrated in a flowchart of FIG. 10. In STEP1, the control unit 302 determines whether it has received a signal indicating that the door 200 is open from the detection switch 33. If the control unit 302 has received the signal (YES in STEP1), then in STEP3, the control unit 302 controls the image formation driving unit 303 to stop the image forming operation. In STEP4, the control unit 302 causes the operation panel 301 to display an indication that the door 200 is open.

Figure 5:
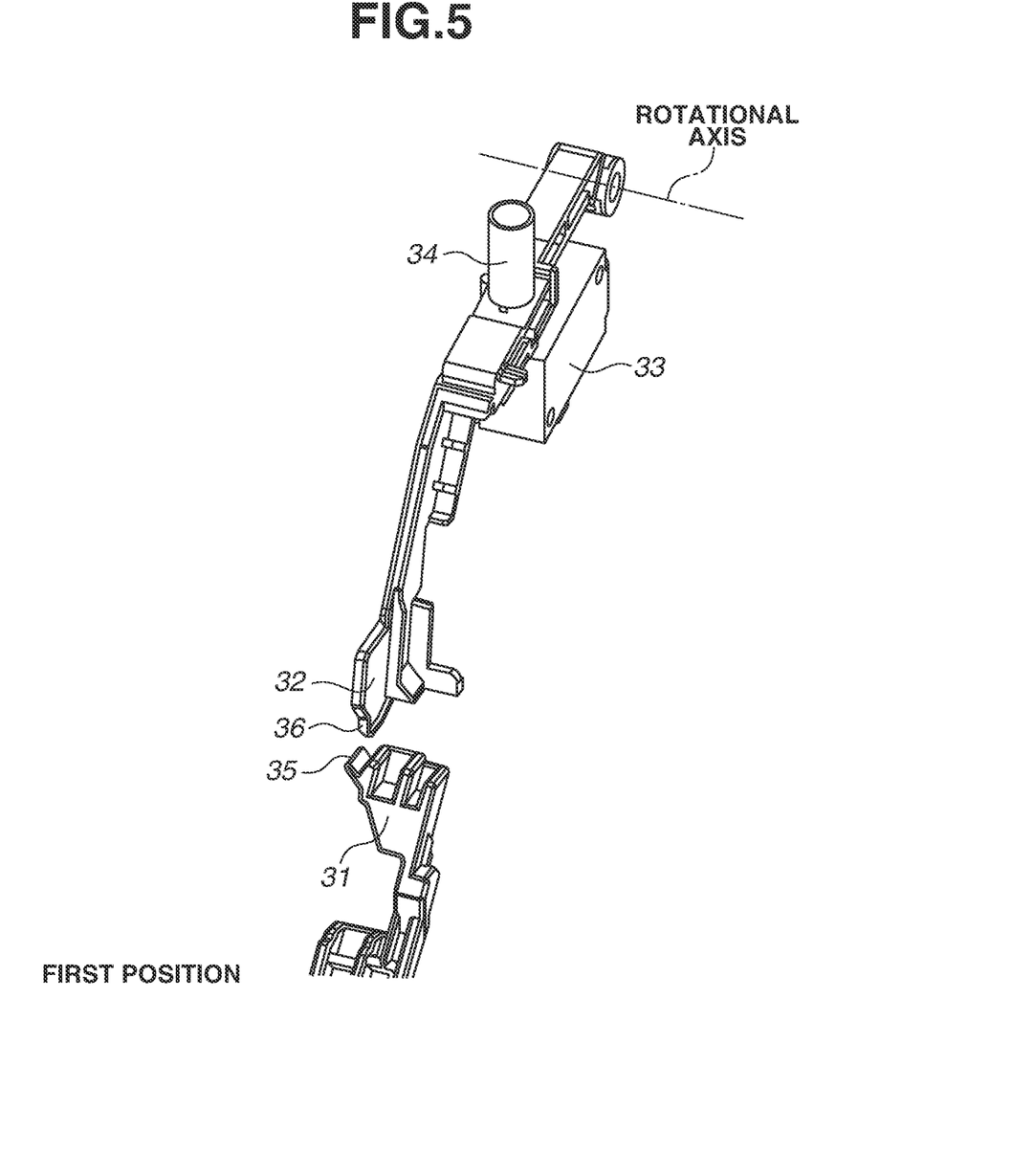
FIG. 5 is a partially enlarged view illustrating a state where the door of the image forming apparatus according to the exemplary embodiment of the present invention is closed.
Figure 6:
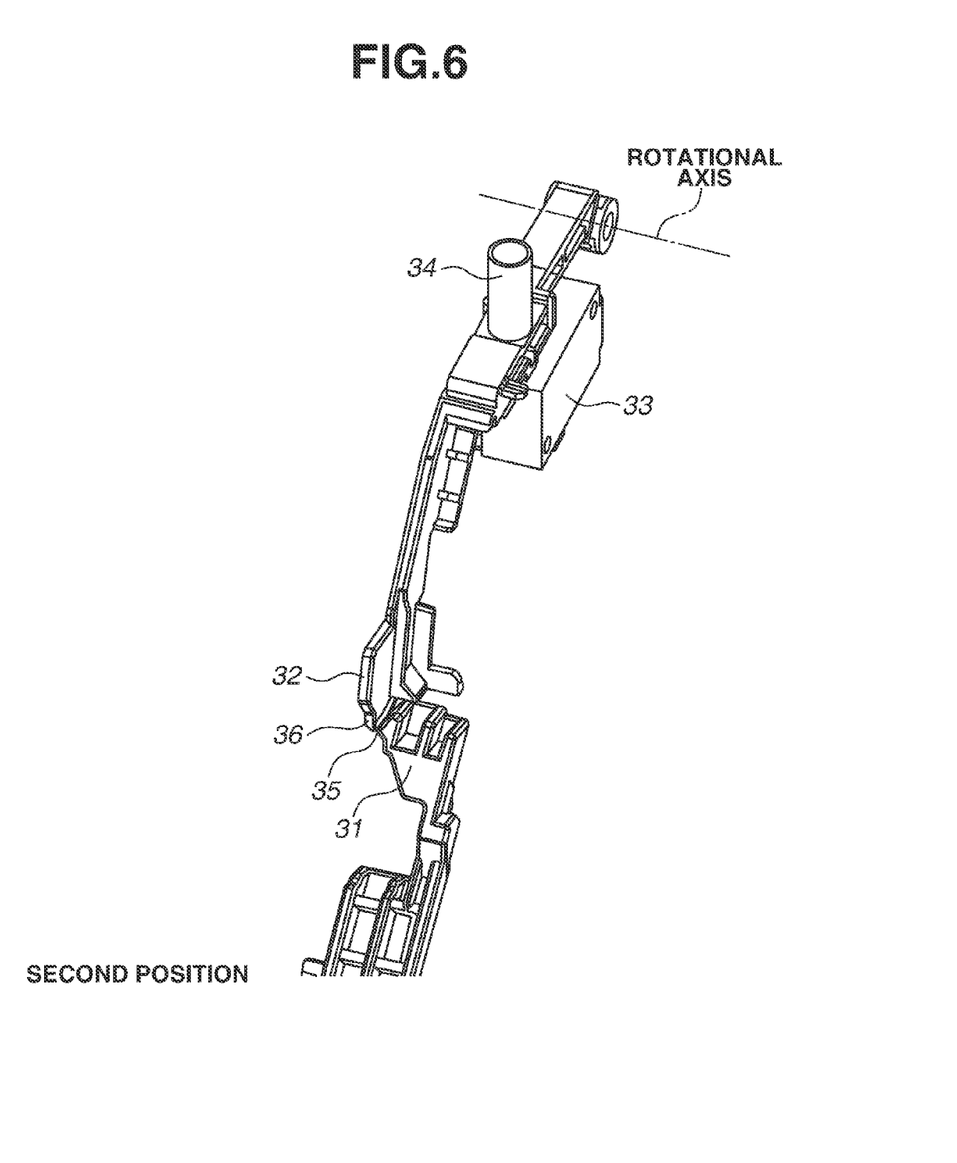
FIG. 6 is a partially enlarged view illustrating a state where the door of the image forming apparatus according to the exemplary embodiment of the present invention is open.
Figure 7:
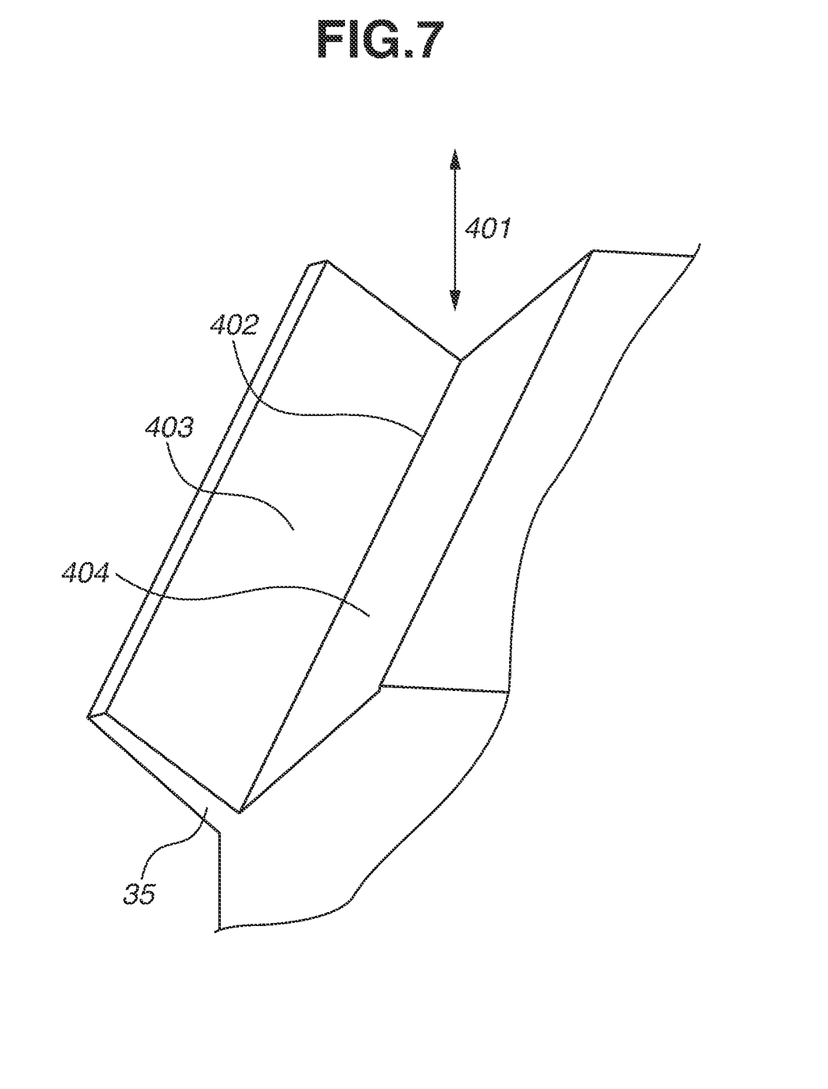
FIG. 7 is a partially enlarged view of a lever pressing member in the exemplary embodiment of the present invention.
Figure 8A:
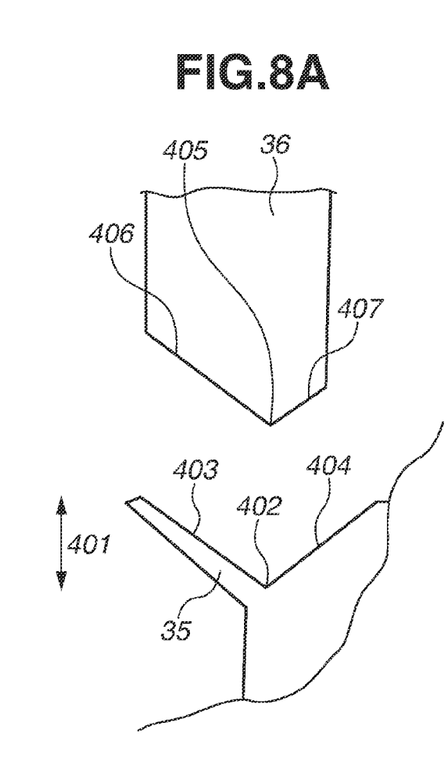
FIG. 8A is a partially enlarged view of the lever pressing member and a switch lever in the exemplary embodiment of the present invention.
Figure 8B:
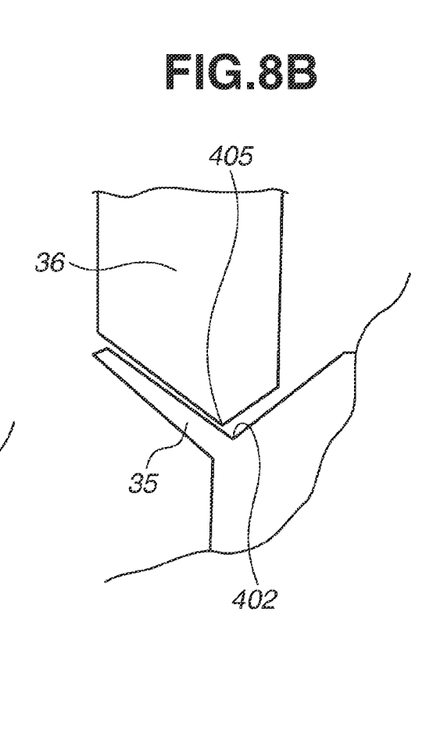
FIG. 8B is a partially enlarged view of the lever pressing member and the switch lever in the exemplary embodiment of the present invention.
Figure 8C:
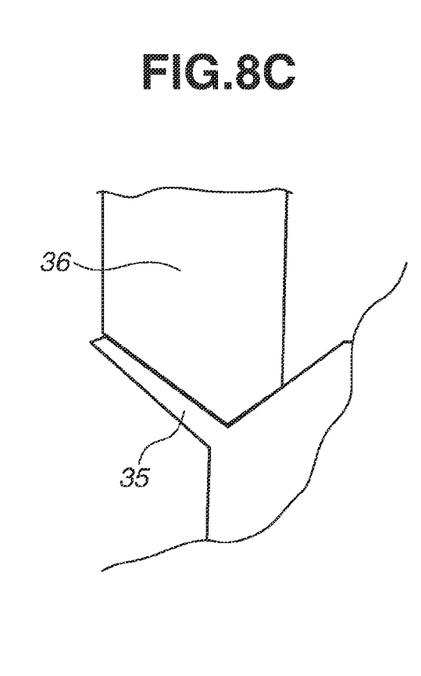
FIG. 8C is a partially enlarged view of the lever pressing member and the switch lever in the exemplary embodiment of the present invention.

A configuration of the lever pressing member 31 and the switch lever 32 will be specifically described below with reference to FIGS. 5 to 8. FIGS. 5 and 6 respectively illustrate a state where the door 200 is closed and a state where the door 200 is open. FIG. 7 is an enlarged view of the first contact portion 35 in the lever pressing member 31. FIG. 8 is an enlarged view of the first contact portion 35 in the lever pressing member 31 and the second contact portion 36 in the switch lever 32.

As previously described, the door 200 is opened when the sheet S remaining in the sheet conveyance path in the image forming apparatus 100 is removed. Accordingly, the sheet conveyance path is arranged in an area corresponding to the size of the door 200 inside the door 200. On the other hand, an image forming apparatus is required to be more miniaturized for user's convenience, so that in the image forming apparatus 100 according to the present exemplary embodiment, the external shape size is also reduced.

Therefore, the lever pressing member 31 and the switch lever 32 serving as a mechanism for detecting the opening or closing state of the door 200 need to be arranged in a limited space outside the sheet conveyance path and inside an exterior part of the image forming apparatus 100. Therefore, both the lever pressing member 31 and the switch lever 32 are partially thinned and can transmit the opening or closing operation of the door 200 to the detection switch 33 in the limited space.

If the contact portion 35 in the lever pressing member 31 and the contact portion 36 in the switch lever 32 constitute a single plane vertical to their movement direction, the following malfunction may occur. When the lever pressing member 31 is to move the switch lever 32 due to contact therebetween, the door 200 may not operate because the contact portions 35 and 36 are horizontally displaced, so that contact between the contact portions 35 and 36 becomes poor. Factors for the malfunction include deformations of the lever pressing member 31 and the switch lever 32, and inclinations of the lever pressing member 31 and the switch lever 32 due to a fitting gap of the lever pressing member 31 or a fitting gap between the lever pressing member 31 and the guide member 22.

To avoid the malfunction, in the present exemplary embodiment, the first contact portion 35 in the lever pressing member 31 is formed into a V-shaped trough having a vertex 402 in a movement direction 401 of the first contact portion 35, as illustrated in FIGS. 7 and 8. More specifically, the first contact portion 35 has a recess portion having two inclined surfaces 403 and 404 inclined toward the opposite sides with respect to the movement direction 401 of the first contact portion 35. The two inclined surfaces 403 and 404 are arranged side by side in a direction intersecting the movement direction 401 (a direction along a rotational axis of the switch lever 32).

The second contact portion 36 serving as a part of the switch lever 32 is formed into a V-shaped crest to be fitted in the V-shaped trough of the first contact portion 35 in the lever pressing member 31. More specifically, the second contact portion 36 has a projection portion having two inclined surfaces 406 and 407 corresponding to the inclined surfaces 403 and 404 of the first contact portion 35 (see FIG. 8A).

In a process where the door 200 is opened and the lever pressing member 31 moves, the trough (recess portion) of the first contact portion 35 in the lever pressing member 31 engages with the crest (projection portion) of the second contact portion 36 in the switch lever 32 (see FIGS. 6 and 8C). That is, the inclined surfaces 403 and 404 of the first contact portion 35 respectively contact the inclined surfaces 406 and 407 of the second contact portion 36. As previously described, the first contact portion 35 has the two inclined surfaces 403 and 404 relative to the movement direction 401 of the first contact portion 35. Therefore, the first contact portion 35 and the second contact portion 36 engage with each other so that a vertex 405 of the second contact portion 36 matches with the vertex 402 of the first contact portion 35 (see FIG. 8C). Thus, in the first contact portion 35 and the second contact portion 36, a mutual transverse displacement can be prevented, enabling reliable operation transmission.

The positions of the first contact portion 35 and the second contact portion 36 may be displaced from each other in a direction perpendicular to the movement direction 401, as illustrated in FIG. 8B, due to the deformations or the fitting gap of the lever pressing member 31 and the switch lever 32 when the first contact portion 35 starts to engage with the second contact portion 36. Even in this case, according to the present exemplary embodiment, the inclined surfaces 403 and 404 invitingly guide the second contact portion 36 so that the first contact portion 35 and the second contact portion 36 remain reliably engaged with each other, as illustrated in FIG. 8C.

In the present exemplary embodiment, the second contact portion 36 has the crest (projection portion) having the two inclined surfaces 406 and 407 respectively corresponding to the inclined surfaces 403 and 404 of the first contact portion 36, as described above. Therefore, the first contact portion 35 and the second contact portion 36 can reliably engage with each other so that the crest-shaped vertex 405 of the second contact portion 36 matches with the trough-shaped vertex 402 of the first contact portion 35.

Even if the first contact portion 35 in the lever pressing member 31 and the second contact portion 36 in the switch lever 32 constitute the single plane vertical to their movement direction, as described above, it is necessary to substantially increase areas of the contact portions 35 and 36 or form a wall for preventing the mutual transverse displacement of the contact portions 35 and 36 outside a range of the contact portions 35 and 36 to prevent a contact failure between the contact portions 35 and 36. When the shapes of the contact portions 35 and 36 increase in size, it becomes difficult to accommodate the lever pressing member 31 and the switch lever 32 in the limited space. As a result, the size of the apparatus main body needs to be increased.

In the present exemplary embodiment, the first contact portion 35 is formed into the trough (recess portion), and the second contact portion 36 is formed into the crest (projection portion). Therefore, while the size of the apparatus main body is reduced, the first contact portion 35 in the lever pressing member 31 can reliably press the second contact portion 36 in the switch lever 32 to move the switch lever 32.

In the present exemplary embodiment, the lever pressing member 31 is directly operated in a substantially vertical direction by opening or closing the door 200. On the other hand, the switch lever 32 is rotated around the support portion 341. When the lever pressing member 31 moves from the first position to the second position by the opening or closing operation of the door 200, therefore, a position at which the lever pressing member 31 and the switch lever 32 actually contact each other moves in a direction perpendicular to the rotational axis of the switch lever 32. That is, in the present exemplary embodiment, the trough (the inclined surfaces 403 and 404) of the first contact portion 35 in the lever pressing member 31 is formed to extend in the direction perpendicular to the rotational axis of the switch lever 32. Therefore, reliable operation transmission by the lever pressing member 31 and the switch lever 32 can be performed without interrupting slide contact between the lever pressing member 31 and the switch lever 32 when the opening or closing operation of the door 200 is performed.

In the above described exemplary embodiment, a form has been illustrated as an example in which the first contact portion 35 in the lever pressing member 31 and the second contact portion 36 in the switch lever 32 are separated from each other when the door 200 is closed and the first contact portion 35 contacts the second contact portion 36 when the door 200 is open. However, the first contact portion 35 in the lever pressing member 31 may contact the second contact portion 36 in the switch lever when the door 200 is closed, and the first contact portion 35 and the second contact portion 36 may be separated from each other when the door 200 is open.

In the above described exemplary embodiment, a form has been illustrated as an example in which the first contact portion 35 in the lever pressing member 31 is formed into the V-shaped trough and the second contact portion 36 in the switch lever 32 is formed into the V-shaped crest. However, one of the first contact portion 35 in the lever pressing member 31 and the second contact portion 36 in the switch lever 32 may be formed into a V-shaped trough and the other contact portion may be formed into a crest. More specifically, the second contact portion 36 in the switch lever 32 may be formed into a V-shaped trough and the first contact portion 35 in the lever pressing member 31 may be formed into a V-shaped crest.

Figure 11A:
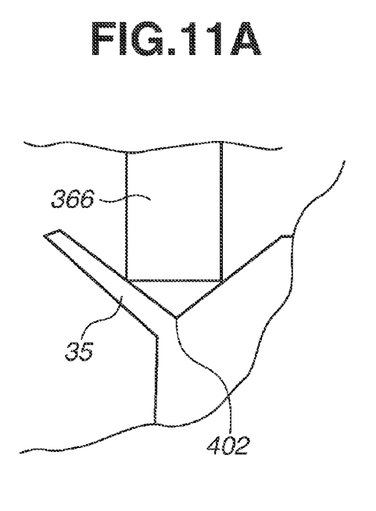
FIG. 11A illustrates a modified example.
Figure 11B:
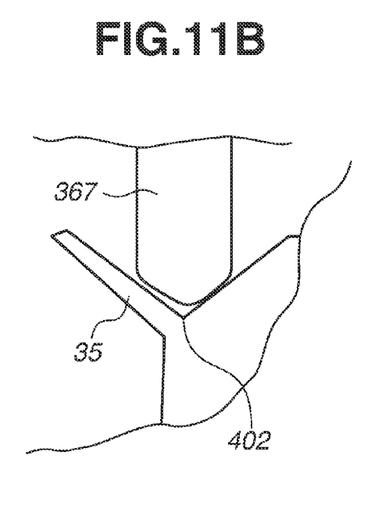
FIG. 11B illustrates a modified example.

In the above described exemplary embodiment, a form has been illustrated as an example in which the second contact portion 36 is formed into the crest having the two inclined surfaces 406 and 407 so that the first contact portion 35 and the second contact portion 36 can more reliably engage with each other. However, the second contact portion 36 need not necessarily have the two surfaces 406 and 407 inclined relative to the movement direction 401 of the first contact portion 35. That is, if the second contact portion 36 contacts the inclined surfaces 403 and 404 of the trough of the first contact portion 35 to fit into the trough (recess portion) of the first contact portion 35, the mutual transverse displacement of the lever in the contact portions 35 and 36 can be prevented. For example, a second contact portion 366 having a flat end (see FIG. 11A) may be used as a modified example. Alternatively, a second contact portion 367 having an end formed in a circular arc shape (see FIG. 11B) may be used as a modified example.

Further, in the above described exemplary embodiment, a form has been illustrated as an example in which the opening/closing cam 21 is fixed to the rotation shaft 201 of the door 200 and the opening/closing cam 21 moves the lever pressing member 31 independently of the door 200. However, the present invention is applicable also to a configuration in which the lever pressing member 31 is fixed to the door 200, and a similar effect to that of the above described exemplary embodiment is obtained. Further, while a form has been illustrated as an example in which the lever pressing member 31 is supported on the apparatus main body such that it can directly operate, the lever pressing member 31 may be rotatably provided.

Furthermore, in the above described exemplary embodiment, a form has been illustrated as an example in which a conveyance path through which the sheets S are conveyed is opened to remove the remaining sheet S by opening the door 200. However, the present invention is also applicable to an image forming apparatus in which maintenance such as replacement of a consumable is performed by opening a door.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-037025, filed Feb. 26, 2015, which is hereby incorporated by reference herein in its entirety.

What is claimed is:

1. An image forming apparatus that forms an image on a sheet comprising:
   an apparatus main body;
   an opening/closing portion that is opened or closed relative to the apparatus main body;
   a first member configured to move as the opening/closing portion is opened or closed;
   a second member including a second contact portion that contacts a first contact portion in the first member and interlocks with the first member;
   a sensor configured to generate a signal corresponding to a position of the second member; and
   a recess portion that is provided in one of the first contact portion and the second contact portion and engages with another portion of the first contact portion and the second contact portion,
   wherein the recess portion has a surface inclined relative to a movement direction of the first contact portion.

2. The image forming apparatus according to claim 1, wherein the recess portion has two surfaces each inclined toward opposite sides with respect to the movement direction of the first contact portion.

3. The image forming apparatus according to claim 2, wherein the two surfaces of the recess portion are provided side by side in a direction intersecting the movement direction of the first contact portion.

4. The image forming apparatus according to claim 2, wherein the second member is rotatably supported on the apparatus main body, and the two surfaces of the recess portion are provided side by side in a direction along a rotational axis of the second member.

5. The image forming apparatus according to claim 1, wherein the recess portion has a cross section formed concave in a V shape.

6. The image forming apparatus according to claim 1, wherein a projection portion to be fitted into the recess portion is provided in the other portion of the first contact portion and the second contact portion.

7. The image forming apparatus according to claim 6, wherein the projection portion has a cross section formed in a V shape to be fitted into the recess portion.

8. The image forming apparatus according to claim 1, wherein the first member is movably supported on the apparatus main body so that it can move independently of the opening/closing portion.

9. The image forming apparatus according to claim 1, wherein the first member is fixed to the opening/closing portion.

10. The image forming apparatus according to claim 1, wherein the other portion of the first contact portion and the second contact portion slidably contacts the recess portion provided in one of the first contact portion and the second contact portion as the opening/closing portion is opened or closed.

11. An image forming apparatus that forms an image on a sheet, comprising:
    an apparatus main body;
    an opening/closing portion that is opened or closed relative to the apparatus main body;
    a first member configured to move as the opening/closing portion is opened or closed;
    a second member that moves while being pressed by the first member;
    a sensor configured to generate a signal corresponding to a position of the second member; and
    a recess portion that is provided in one of the first member and the second member and has a cross section formed concave in a V shape; and
    a projection portion that is provided in another portion of the first member and the second member, is fitted into the recess portion when the first member presses the second member, and has a cross section formed in a V shape.

12. The image forming apparatus according to claim 11, wherein the first member is movably supported on the apparatus main body to move independently of the opening/closing portion.

13. The image forming apparatus according to claim 11, wherein the first member is fixed to the opening/closing portion.

14. The image forming apparatus according to claim 11, wherein the other portion of the first contact portion and the second contact portion slidably contacts the recess portion provided in one of the first contact portion and the second contact portion as the opening/closing portion is opened or closed.

15. An image forming apparatus that forms an image on a sheet, comprising:
- an apparatus main body;
- an opening/closing portion that is opened or closed relative to the apparatus main body;
- a first member that includes a first contact portion and moves as the opening/closing portion is opened or closed;
- a second member that includes a second contact portion contacting the first contact portion in the first member and interlocks with the first member;
- a sensor configured to generate a signal corresponding to a position of the second member; and
- a recess portion that is provided in one of the first contact portion and the second contact portion; and
- a projection portion that is provided in another portion of the first contact portion and the second contact portion and engages with the recess portion,
- wherein at least one of the recess portion and the projection portion has a surface inclined relative to a movement direction of the first contact portion.

16. The image forming apparatus according to claim 15, wherein the recess portion has two surfaces each inclined toward opposite sides with respect to the movement direction of the first contact portion.

17. The image forming apparatus according to claim 16, wherein the two surfaces of the recess portion are provided side by side in a direction intersecting the movement direction of the first contact portion.

18. The image forming apparatus according to claim 16, wherein the second member is rotatably supported on the apparatus main body, and the two surfaces of the recess portion are provided side by side in a direction along a rotational axis of the second member.

19. The image forming apparatus according to claim 15, wherein the recess portion has a cross section formed concave in a V shape.

20. The image forming apparatus according to claim 15, wherein the engaging portion has a cross section formed in a V shape to be fitted into the recess portion.

* * * * *